Nov. 27, 1951     H. A. MICHAELIS ET AL     2,576,409
SECTIONAL COUNTER KITCHEN
Filed June 19, 1948
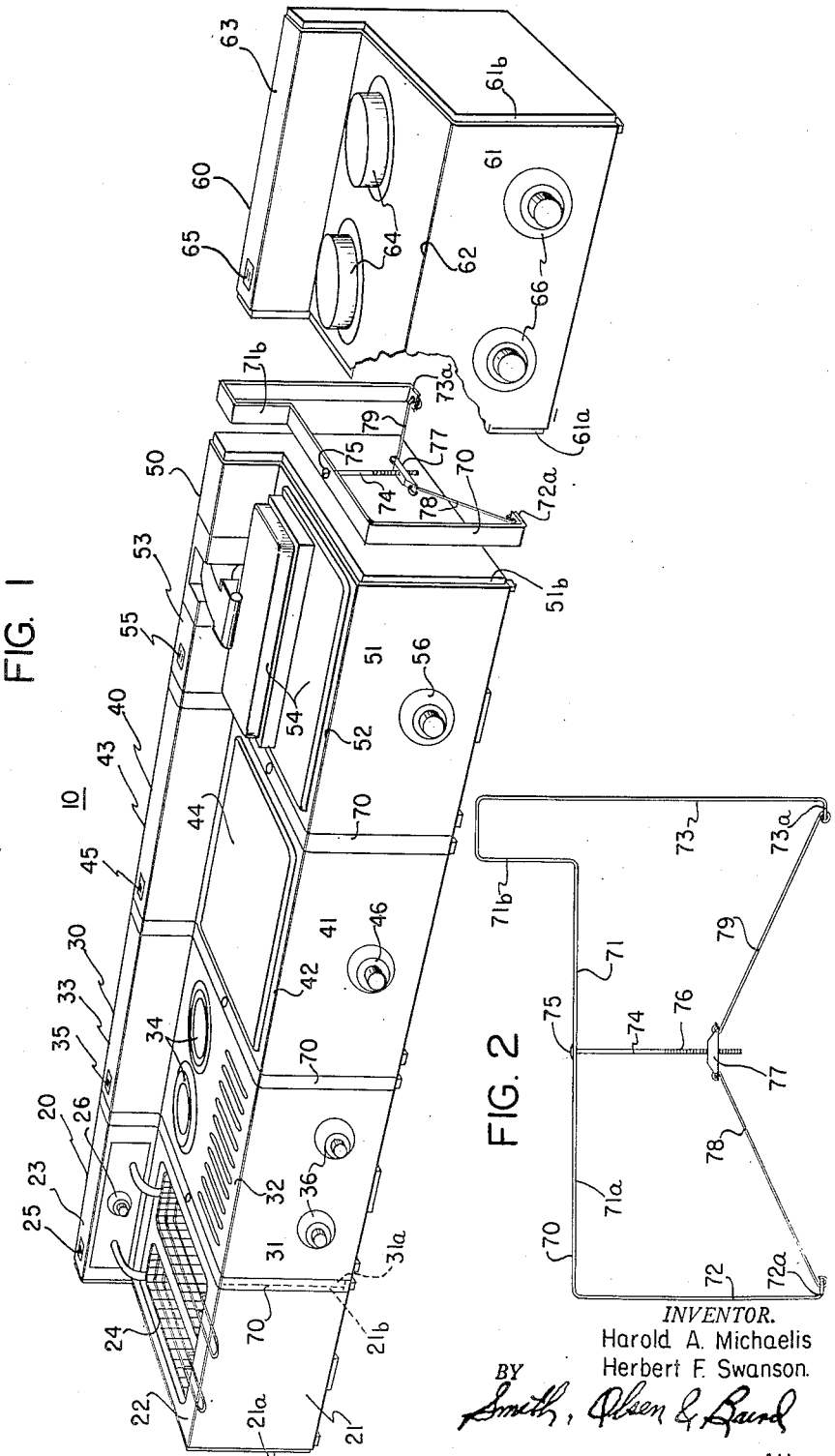

Patented Nov. 27, 1951

2,576,409

UNITED STATES PATENT OFFICE 2,576,409

SECTIONAL COUNTER KITCHEN

Harold A. Michaelis, Elmhurst, and Herbert F. Swanson, Chicago, Ill., assignors to Hotpoint Inc., a corporation of New York Application June 19, 1948, Serial No. 34,042

4 Claims. (Cl. 312—107)

1

The present invention relates to cooking apparatus and more particularly to counter kitchens including a plurality of individual cooking units and adapted to commercial cooking in restaurants, hotels and the like.

A conventional counter kitchen of the type noted usually comprises a plurality of individual cooking units adapted to perform both the same and different cooking operations, and ordinarily the individual units are of different sizes and designs so that the counter line presents a broken and disorderly appearance. Moreover, the utilization of the counter space is very inefficient, the cooking operations are carried out in an unhandy and uneconomical manner, and satisfactory cleaning is exceedingly difficult.

Accordingly, it is a general object of the present invention to provide an improved counter kitchen comprising a plurality of individual cooking units in which the individual units are designed and retained in assembled relation in order to provide a compact arrangement presenting an unbroken appearance in the counter line and permitting thorough and easy cleaning.

Another object of the invention is to provide cooking apparatus of the type noted wherein both the numbers and the relative positions of the individual units performing both the same and different cooking operations may be readily adjusted in the counter line as required.

A further object of the invention is to provide cooking apparatus of the type noted wherein the individual units comprise substantially identical casings so that any two of the individual units may be readily interchanged without disturbing the other individual units in the counter line.

A further object of the invention is to provide cooking apparatus comprising a bank of individual cooking units and a readily detachable clip arrangement for securing the individual units in assembled relation in the bank.

Further features of the invention pertain to the particular arrangement of the elements of the individual cooking units and of the retaining clips whereby the above outlined and additional operating features thereof are attained.

The invention both as to its organization and method of operation, together with further objects and advantages thereof will best be understood by reference to the following specification taken in connection with the accompanying drawing in which Figure 1 is an exploded perspective view, partly broken away, of cooking apparatus embodying the present invention; and Fig. 2 is

2 an enlarged and elevational view of one of the securing clips incorporated in the cooking apparatus shown in Fig. 1.

Referring now more particularly to Fig. 1 of the drawing, the cooking apparatus or counter kitchen 10 there illustrated and embodying the features of the present invention is expressly adapted to commercial cooking in restaurants, hotels and the like, and comprises a number of individual cooking units arranged in a bank or counter line. Specifically, the counter kitchen 10 comprises, as illustrated, five individual cooking units 20, 30, 40, 50 and 60 arranged in end-to-end relation and secured together in assembled relation by four intervening clips 70, the assembly being supported upon an elongated counter, not shown.

The cooking unit 20 comprises a fry kettle which is provided with a casing 21 including a substantially horizontal platform 22 terminating in an upstanding backsplasher 23. The platform 22 is provided with conventional fry kettle equipment 24 and the top of the backsplasher is provided with a receptacle 25 adapted to receive a plug, not shown, connected to a suitable source of power. Also, the front of the backsplasher 23 carries a control switch 26 that may be selectively operated to control the heating elements, not shown, associated with the fry kettle equipment 24.

The cooking unit 30 comprises a hot plate and is provided with a casing 31 including a substantially horizontal platform 32 terminating in an upstanding backsplasher 33. The platform 32 is provided with conventional hot plate equipment 34 and the top of the backsplasher 33 is provided with a receptacle 35 adapted to receive a plug, not shown, connected to a suitable source of power. Also, the front of the casing 31 carries two control switches 36 that may be selectively operated to control the heating elements, not shown, associated with the hot plate equipment 34.

The cooking unit 40 comprises a griddle and is provided with a casing 41 including a substantially horizontal platform 42 terminating in an upstanding backsplasher 43. The platform 42 is provided with conventional griddle equipment 44 and the top of the backsplasher 43 is provided with a receptacle 45 adapted to receive a plug, not shown, connected to a suitable source of power. Also, the front of the casing 41 carries a control switch 46 that may be selectively operated to control the heating elements, not shown, associated with the griddle equipment 44.

The cooking unit 50 comprises a combination griddle and grill and is provided with a casing 51 including a substantially horizontal platform 52 terminating in an upstanding backsplasher 53. The platform 52 and the backsplasher 53 are provided with conventional combination griddle and grill equipment 54 and the top of the backsplasher 53 is provided with a receptacle 55 adapted to receive a plug, not shown, connected to a suitable source of power. Also, the front of the casing 51 carries a control switch 56 that may be selectively operated to control the heating elements, not shown, associated with the combination griddle and grill equipment 54.

The cooking unit 60 comprises a waffle baker and is provided with a casing 61 including a substantially horizontal platform 62 terminating in an upstanding backsplasher 63. The platform 62 is provided with conventional waffle baker equipment 64 and the top of the backsplasher 63 is provided with a receptacle 65 adapted to receive a plug, not shown, connected to a suitable source of power. Also, the front of the casing 61 carries two control switches 66 that may be selectively operated to control the heating elements, not shown, associated with the waffle baker equipment 64.

The casings 21, etc. are substantially identical, conforming in general outline to standard dimensions so that the platforms 22, etc. are arranged substantially co-planar and the backsplashers 23, etc. are arranged substantially in alignment and co-planar, when the casings 21, etc. are supported in a bank upon a substantially level counter. Also, each end of each casing 21, etc. substantially conforms to a fixed configuration so that the individual units 20, etc. may be assembled both in any numbers and in any relative positions in the bank. In other words, the contiguous ends of adjacent units 20, 30, etc. substantially match each other without reference to the relative positions of the units in the bank. Moreover, since the length of each of the casings 21, 31, etc. substantially conforms to the fixed dimension, any two of the units may be interchanged without disturbing the other units in the bank. Specifically, the opposite ends of each casing 21, etc. has two substantially identical depressions 21a and 21b formed therein and respectively disposed left and right. Thus when the units 20 and 30 are arranged adjacent to each other, the depression 21b formed in the right-hand end of the casing 21 is disposed in alignment with and contiguous to the depression 31a formed in the left-hand end of the casing 31; which contiguous depressions 21b and 31a receive the associated clip 70, as explained more fully below. Finally each of the units 20, etc. comprises a plurality of independently adjustable feet, not shown, for the purpose of leveling the unit on the counter, not shown.

Each of the clips 70 comprises a body portion 71 including a substantially horizontally disposed platform engaging section 71a and an upstanding backsplasher engaging section 71b and two spaced-apart legs 72 and 73 respectively provided with inturned ends 72a and 73a, the legs 72 and 73 being adapted respectively to engage the front and the rear of the contiguous ends of adjacent units and the inturned ends 72a and 73a being adapted respectively to under-hook the front and the rear contiguous ends of the adjacent units. Also, the clip 70 carries mechanism arranged entirely within the confines thereof and including an elongated element 74 provided with a head 75 and a threaded shank 76. The element 74 is arranged between the legs 72 and 73 and extends through an opening formed in the body 71, the opening being countersunk to receive the head 75 substantially flush with the upper surface of the body 71. The lower end of the threaded shank 76 carries an internally threaded nut 77 to which two draw bars 78 and 79 are connected. More particularly the inner ends of the draw bars 78 and 79 are pivotally connected to the nut 77 and the outer ends of the draw bars 78 and 79 are respectively pivotally connected to the inturned ends 72a and 73a of the legs 72 and 73 respectively.

In view of the foregoing description of the mechanism disposed within the clip 70, and comprising the rotatable element 74, the nut 77 and the bars 78 and 79, it will be understood that the element 74 may be rotated in either direction from the exterior of the clip 70 by inserting a screw driver, or the like, into a slot provided in the head 75. When the element 74 is rotated in one direction and pressed downwardly the nut 77 travels downwardly upon the threaded shank 76, causing the bars 78 and 79 to spread apart the legs 72 and 73, thereby opening the clip 70 so that it may be readily placed over the contiguous ends of two adjacent units in the assembly of the cooking apparatus 10. On the other hand, when the element 74 is rotated in the opposite direction, the nut 77 travels upwardly, causing the bars 78 and 79 to draw the legs 72 and 73 and the body 71 mutually toward each other, whereby the clip 70 is drawn into snug engagement with the contiguous ends of adjacent units in the assembly of the cooking apparatus 10.

In the cooking apparatus 10 the casings 21, etc. may be formed of stainless steel, or the like, presenting a highly polished, smooth exterior surface having an attractive appearance that may be readily cleaned. Likewise, the clip 70 may be formed of any suitable resilient material such, for example, as stainless steel, or the like, presenting a smooth, highly polished exterior surface having an attractive appearance that may be readily cleaned. Preferably the materials of the casings 21, etc. and the clips 70 are identical so that the general appearance of the assembled cooking apparatus 10 is uniform and unbroken and may be readily cleaned.

In view of the foregoing it will be understood that the cooking apparatus 10 may comprise any suitable number of the cooking units 20, etc. and that the assembly may comprise two or more of any one type of the cooking units 20, etc. that may be arranged either adjacent to each other or in spaced-apart relation in the bank. Further, it will be appreciated that the whole assembly of cooking apparatus 10 may comprise only one or two types of cooking units, thereby permitting complete flexibility in the assembly in view of the requirements of the particular counter kitchen.

In assembling the cooking apparatus 10 the various units 20, etc. are placed upon the associated counter, not shown, in end-to-end relation and in substantial alignment with respect to each other and spaced apart a short distance. With specific reference to the cooking apparatus 10, as illustrated, after the cooking units 20, 30, 40, 50 and 60 have been placed in proper relation with respect to each other, four of the clips 70 are selected and operated to their open positions by appropriate manipulation of the rotatable elements 74. One of the clips 70 is then inserted between the contiguous ends of the adjacent cooking elements 20 and 30 whereby the mechanism arranged within the clip 70, and including the rotatable element 74, the nut 77 and the bars 78 and 79, is positioned between the contiguous ends of the adjacent units 20 and 30. At this time the clip 70 is arranged in the contiguous depressions 21b and 31a formed in the contiguous ends of the adjacent units 20 and 30. The rotatable element 74 is then operated from the exterior of the clip 70 by inserting a screwdriver, or the like, into the slot formed in the head 75, whereby the legs 72 and 73 are drawn together, causing the clip 70 snugly to engage the contiguous ends of the adjacent units 20 and 30. Incident to tightening the clip 70, the platforms 22 and 32 and the backsplashers 23 and 33 are drawn into alignment and into co-planar positions whereby the units 20 and 30 are securely fastened to each other. At this time the different portions of the clip 70 are disposed in the different and corresponding portions of the depressions 21b and 31a formed in the contiguous ends of the adjacent units 20 and 30, whereby a smooth, continuous joint is provided between the corresponding surfaces of the casings 21 and 31 by the clip 70.

The three other clips 70 are then respectively placed in an identical manner between the units 30, 40 and 40, 50 and 50, 60 in order to complete the assembly. Since each two adjacent units are at this time securely fastened to each other, the five units 20, etc. are securely retained in assembled relation in the bank producing the cooking apparatus 10 ready for use. After the cooking apparatus 10 has thus been assembled it will be understood that one or more additional units of any one of the five types described above may be readily added thereto at either end thereof in a manner substantially identical to that described above, utilizing one or more additional clips 70. Moreover, in the cooking apparatus 10 any two of the cooking units 20, etc. may be interchanged without disturbing the remainder of the cooking units in the bank merely by loosening the appropriate clips 70 and shifting the cooking units that are to be interchanged and finally replacing the required clips 70. In both assembling and disassembling the cooking units 20, etc. it will be appreciated that the appropriate clips 70 may be opened or closed as required entirely from the exterior by appropriate manipulation of the rotatable elements 74 by the heads 75. The assembly of cooking units 20, etc. in the counter kitchen 10 not only presents a pleasing unbroken appearance but makes an efficient utilization of the counter space and permits ready cleaning of the entire assembly in a simple and direct manner.

In view of the foregoing it is apparent that an improved counter kitchen has been provided that permits ready placement and removal of any one or more of a plurality of individual cooking units, which counter assembly comprises a compact arrangement of the individual cooking units and presents an unbroken appearance in the counter line, permitting thorough and easy cleaning.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A counter kitchen comprising two individual cooking units arranged in contiguous end-to-end relation, each end of each of said units having a depression formed therein below the principal surface thereof and substantially conforming to a fixed configuration so that the contiguous ends of said units substantially match regardless of the relative positions thereof in said end-to-end relation, a resilient clip substantially conforming to said fixed configuration and arranged in the depressions formed in the contiguous ends of said units to provide a smooth joint between the principal surfaces of said units in order to lend a continuous unbroken appearance to said counter kitchen, and mechanism disposed within said clip and between the contiguous ends of said units for drawing said clip into snug engagement with the depressions formed in the contiguous ends of said units to secure said units in assembled relation, said mechanism being operable from the exterior of said clip.

2. Cooking apparatus comprising two individual cooking units arranged in end-to-end relation, each end of each of said units substantially conforming to a fixed configuration so that the contiguous ends of said units substantially match regardless of the relative positions thereof in said end-to-end relation, a resilient clip substantially conforming to said fixed configuration and overlying the contiguous ends of said units, and mechanism disposed mutually within said clip and between the contiguous ends of said units for drawing said clip into snug engagement with the contiguous ends of said units, said mechanism being operable from the exterior of said clip.

3. Cooking apparatus comprising two individual cooking units arranged in end-to-end relation, each end of each of said units substantially conforming to a fixed configuration so that the contiguous ends of said units substantially match regardless of the relative positions thereof in said end-to-end relation, a resilient clip including two spaced-apart legs and a joining body and substantially conforming to said fixed configuration and overlying the contiguous ends of said units, an element rotatably mounted in an opening provided in said body and including a threaded shank extending between said legs, a nut arranged on said threaded shank, two draw bars, means respectively pivotally connecting the outer ends of said bars to said legs, and means pivotally connecting the inner ends of said bars to said nut, said element and said nut and said bars being disposed between the contiguous ends of said units, said element being rotatable from the exterior of said clip to cause said nut to draw said bars in order to move said legs and said body mutually toward each other so that said clip is drawn into snug engagement with the contiguous ends of said units.

4. Cooking apparatus comprising a plurality of individual cooking units arranged in end-to-end relation in a bank, each end of each of said units substantially conforming to a fixed configuration so that both the number of said units and the relative positions thereof in said bank may be readily adjusted as required, and means including a plurality of resilient clips for securing said units in assembled relation, each of said clips including a body substantially conforming to said fixed configuration and overlying the contiguous ends of adjacent units and carrying mechanism disposed therein and operable from the exterior thereof for drawing the body thereof into snug engagement with the contiguous ends of adjacent units.

HAROLD A. MICHAELIS.
HERBERT F. SWANSON.

REFERENCES CITED

The following references are of record in the file of this patent:

UNITED STATES PATENTS

| Number | Name | Date |
|---|---|---|
| 1,195,817 | Hormes | Aug. 22, 1916 |
| 2,074,780 | Demcak | Mar. 23, 1937 |
| 2,279,945 | Hoffman | Apr. 14, 1942 |
| 2,326,414 | Thompson | Aug. 10, 1943 |
| 2,337,095 | Frick | Dec. 21, 1943 |

FOREIGN PATENTS

| Number | Country | Date |
|---|---|---|
| 257,296 | Great Britain | May 5, 1927 |

OTHER REFERENCES

American Stove Company: "27 Years of Progress," 1938.